United States Patent [19]

Neale et al.

[11] Patent Number: 5,952,068
[45] Date of Patent: Sep. 14, 1999

[54] SYNTACTIC FOAM INSULATED CONTAINER

[75] Inventors: Douglas L. Neale, Allendale, N.J.; Richard J. Pasin, Wilmington, N.C.

[73] Assignee: Insulation Dimension Corporation, Leland, N.C.

[21] Appl. No.: 08/661,332

[22] Filed: Jun. 14, 1996

[51] Int. Cl.⁶ ........................................................ B32B 5/18
[52] U.S. Cl. ..................... 428/36.5; 428/34.2; 428/35.7; 428/220; 428/313.5; 428/333; 428/339; 428/542.8; 229/403; 220/62; 220/592.17; 220/592.22; 220/592.25; 220/903; 215/13.1; 215/382
[58] Field of Search ................................. 428/34.2, 36.5, 428/220, 333, 339, 313.5, 542.8, 35.7; 215/13.1, 382; 229/403; 220/415, 444, 903, 62, 592.17, 592.22, 592.25

[56] References Cited

U.S. PATENT DOCUMENTS

| | | | |
|---|---|---|---|
| 3,468,467 | 9/1969 | Amberg | 229/403 |
| 4,237,171 | 12/1980 | Laage et al. | 428/34.2 X |
| 5,145,107 | 9/1992 | Silver et al. | |
| 5,226,585 | 7/1993 | Varano | |
| 5,363,982 | 11/1994 | Sadlier | |
| 5,490,631 | 2/1996 | Iioka et al. | 229/403 |
| 5,705,242 | 1/1998 | Andersen et al. | 428/36.5 X |

*Primary Examiner*—Fred Teskin
*Attorney, Agent, or Firm*—Gibbons, Del Deo, Dolan, Griffinger & Vecchione

[57] ABSTRACT

A single walled container for storing hot or cold foods or liquids having a layer of insulation comprised of void containing particles held together with a binder applied to the outer part of the sidewall. The insulation layer provides a controlled amount of insulation which is sufficient to prevent pain to the fingers yet it transmits sufficient heat to warn the user of the temperature of the container's contents. The binder may be any thermoplastic or thermoset resin, and other ingredients may be added to the binder to control viscosity, density, or color.

64 Claims, 6 Drawing Sheets

SYNTACTIC FOAM INSULATED CONTAINER

CROSS REFERENCE TO RELATED APPLICATION

This application is related to another U.S. Pat. No. 5,759,624 entitled "METHOD OF MAKING SYNTACTC INSULATED CONTAINERS", having common inventors and assignees and being incorporated herein by reference.

BACKGROUND OF THE INVENTION

1. Field of the Invention

This invention relates to any insulated container, and more particularly to one which is made from paper or paper board upon which a syntactic foam is deposited for insulation.

2. Description of Related Art

The production and use of disposable containers, such as cups, is well known with production measured in the billions of units annually. Because of this volume, the business is fiercely competitive and cost is measured in units of one thousand. A change of a few percent in cost can make a container unsaleable, particularly to large fast food chains.

Paper and paperboard are widely used as materials in the production of disposable containers because they are inexpensive and amenable to very high volume production. They have limitations, however, particularly in containing hot liquids which are dispensed from coffee machines or supplied in fast food restaurants. The initial temperature of coffee poured into a disposable cup can exceed 200 degrees Fahrenheit, and the temperature achieved on the outside of the cup can make it painful to hold. A person's reaction to this pain can cause spillage, severe damage to the skin, and inevitable product liability litigation.

Consequently there have been many attempts to provide improved insulation to paper containers. U. S. Pat. No. 5,363,982 to Sadlier shows a cup formed from one continuous sheet where the outer and inner shells are spaced apart by a corrugated layer which forms many air pockets between the shells to insulate the cup and provide greater strength. The blank from which the cup is formed is at least three times as long as that for a conventional cup, thereby adding to the cost.

U.S. Pat. No. 5,226,585 to Varano discloses a double wall structure in which inwardly directed ribs from the outer surface maintain a gap between the walls to provide insulation. Again added material means added cost.

U.S. Pat. No. 5,145,107 to Silver et al. teaches a double wall structure wherein the inner wall is connected to the outer one only at the lip and at the base of the cup. The walls have different tapers thereby defining a dead air space between them which provides insulation.

Accordingly, there still exists a need for an inexpensive container which provides a controlled amount of heat transfer to warn the user that a hot liquid is contained therein, which insulates sufficiently to protect against pain or burn, which is stackable for shipping and mass sales, and which is microwave compatible.

SUMMARY OF THE INVENTION

The present invention relates to any insulated container for hot or cold products and liquids. To be responsive to the needs referenced above, the container needs to be inexpensive, so a layer of insulation is applied to one side of a blank used to make it. The blank is typically paper or paperboard to control cost, but the insulation could be applied to a single-walled plastic cup as well. The insulation is a syntactic foam, that is, a foam which incorporates insulating particles which are held in place by a binder. Greater insulation is obtained where the insulating particles are void containing particles which can be made from thermoplastic, thermoset, or inorganic materials which enclose an air space. The void containing particles may be of arbitrary shape and they may be applied to the blank in expanded or unexpanded form. A subsequent heating operation may be used to expand previously unexpanded particles so that they contain voids. There are many different types of void containing particles and they may be used alone or in combination with each other to achieve a particular degree of insulation or other mechanical properties. These void containing particles are held in place by a binder, into which other ingredients may also be added to produce a color (pigment), to control viscosity (thickeners and solvents), and to control density (fillers and foaming agents).

The syntactic foam avoids the need for double-walled construction with spacers, which construction uses as much as three times the paper stock. The foam also provides a controlled degree of insulation by adjusting its thickness, particle type, and composition, so that a user has enough sensation to know that a hot or cold liquid is inside the cup, yet not enough sensation to cause discomfort.

The container may be cone shaped so it is nestable as are most paper cups, and the materials of its construction may be inserted into a microwave oven without damage.

The insulating layer may be applied in various configurations. In one embodiment of the invention the foam is applied in a continuous layer on the outside of the cup's sidewall, nearly covering the blank from which the cup is made except for edge areas which are designated for sealing the sidewall to itself and the bottom of the cup and the formation of the rolled rim at the top of the cup.

In another embodiment of the invention, the outer insulating coating is applied as a pattern of matrix elements, which may be dots, lines, quadrangles, arcs, letters, symbols, or any other fanciful configuration. The interrupted pattern saves material, yet still keeps fingers away from the sidewall because of air spaces between the pattern elements are limited so that fingers can not descend between the elements to touch the sidewall.

In yet another embodiment, a tie coat is interspersed between the insulating pattern elements and the sidewall to promote adhesion.

In a further embodiment, a thermally insulating outer coating is continuous over most of the blank and pattern elements are printed thereon.

In yet a further embodiment, the outer insulating coating defines a frame within which graphic information may be printed. The outer coating may be continuous or a matrix of pattern elements.

In still a further embodiment a foldable container suitable for hot or cold foods or liquids is insulated with a syntactic foam as described in the previous embodiments.

In an additional embodiment a syntactic foam is supported by a substrate which may be plastic, paper, or paperboard, the substrate being adapted to be formed into a frustro-cone which may be placed over a conventional cup as a sleeve. The foam may be in any number of layers and compositions as described in all the previous embodiments. The sleeve may be attached to a conventional cup or container by any adhesive or sealing method well known in the art. This embodiment has the advantage of providing thermal insulation to the vast inventory of conventional cups or containers.

Multilayer applications may be contemplated for some of the embodiments, and a combination foam employing void containing particles together with a foaming agent may produce a spongy coating incorporating the void containing particles. Expanded or unexpanded void containing particles may be applied singly or in combination.

These and other features and advantages of the invention will be better understood with consideration of the following detailed description of the preferred embodiments taken in conjunction with the accompanying drawings.

Figure 1A:
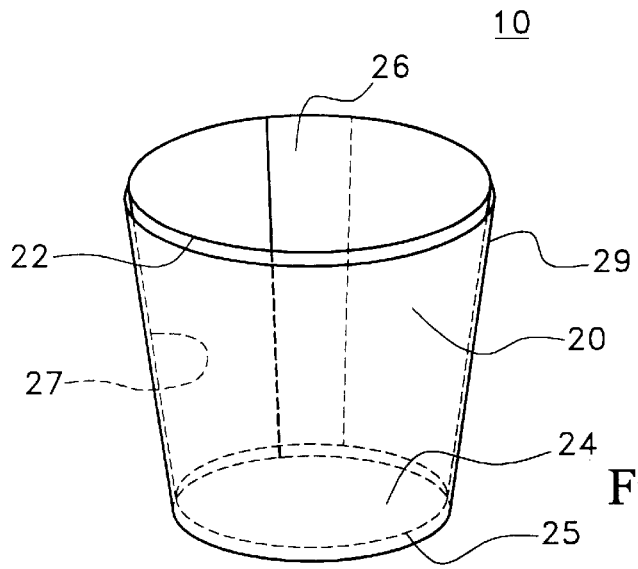
FIGS. 1A–1I show a typical container (A), the blank from which it is produced (B), and a cross sections of various sidewalls (C to I), in one embodiment of the invention.

The drawings are not to scale.

DETAILED DESCRIPTION OF THE PREFERRED EMBODIMENTS

The use of disposable containers reaches billions of units per year in the home and in the fast food industry. These containers are often in the form of drinking cups which are made from paper, paperboard, or plastic, and to be competitive in the marketplace they must be very inexpensive. Paper or paperboard is an inexpensive material, and it is also well adapted to high volume production. To produce a container, paper stock is coated on one side with a thin layer of polyethylene which makes the cup impervious to moisture and which also seals the seam of the cup after the blank is die cut from the paper stock and formed around a similarly coated base to form a cup. However, paper or paperboard is not a sufficient thermal insulator when used for the sidewalls of a cup which stores hot liquids. For example, coffee can be made and dispensed at temperatures near 200 degrees Fahrenheit. A common experience is lifting a paper cup from a coffee dispensing machine and burning the fingers on the sidewall of the cup.

A variety of configurations have been proposed to improve the insulation properties of the sidewall of paper containers by using double walled sidewalls which trap air and reduce heat transfer. These approaches can add a factor of three times the material cost or complicate the forming and sealing operation.

The present invention uses a single layer wall with an added layer of insulation on the external side of the sidewall. The layer may be applied on the outside wall in a single coat, or in multiple coats, in a continuous pattern or in a matrix pattern of lines, dots, or any other fanciful pattern. High volume printing, in moderately thick layers as used in the present invention, is well known in the graphic arts industry.

U.S. Pat. No. 4,902,722 given to Melber describes the use of syntactic foam graphic arts print media. Syntactic foams have cells which are preformed by way of incorporating small hollow spheres into them, rather than by making the foam by the expansion of a blowing agent. The spheres are called microspheres or microballons by various inventors and they have particle sizes ranging from approximately one to 100 microns in the graphic arts industry, and even larger when they are used in the molded parts industry.

U.S. Pat. No. 5,120,769 given to Dyksterhouse, et al. teaches the preparation of syntactic foams and suitable powder compositions. This is an excellent tutorial describing the geometry of microspheres, the surrounding polymer binder, and the use of solvents, surfactants, thickeners, and fillers. The materials disclosed in this patent are incorporated herein by reference.

U.S. Pat. No. 5,385,778 given to Deviney et al. shows the use of microspheres to improve the mechanical toughness of plastic molded parts. The microspheres interrupt the propagation of cracks in high performance plastic structures. In this case the particle size of the microspheres ranges from 0.1 to 50 microns.

U.S. Pat. No. 5,244,613 given to Hurley et al. describes the production of reinforced moldings formed in a reaction injection molding operation. The addition of microspheres improves the mechanical properties by reducing density, lowering volume costs, improving impact resistance, and reducing shrinkage. The reaction injection molding process has become important in the production of external automotive body parts.

The present invention incorporates graphic arts application processes and the use of microspheres in syntactic foams to control thermal properties, rather than the mechanical properties described above.

Referring now to FIG. 1A, there is shown container 10 having a lip 22 which is supported by sidewall 20 which overlaps upon itself at seam 26. The sidewall is formed in the form of a frustro-cone which is open at the top and which encloses base 24. The sidewall has an outer surface 29 and an inner surface 27 and it is rolled from blank 28 which is cut from stock, typically plastic, paper or paperboard, and preferably solid bleached sulfate ranging in thickness from 10 mils to 26 mils. The stock is coated one side with inner coating 32, which is typically a thermoplastic, and preferably polyethylene whose thickness ranges from 0.5 mils to 2.0 mils. The coating of paper or paperboard with polyethylene is well known and stock of this type is available commercially from several sources. The purpose of the inner coating is two-fold: first, it seals the paper or paperboard and makes it impervious to liquids; second, it seals the container at seam 26 and at the intersection of the sidewall with edge 25 of base 24. This method of construction is given by way of example because the method of construction may vary with the type of container. Not all containers are heat sealed. Some are locked together or they may be glued together like a clamshell. The adhesives may range from heat seals, hot melts, pressure sensitive, and cold set types which are well known in the art of making containers. Machines which seal the base and sidewall are well known and are adapted to high volume production. The outer surface 29 of sidewall 20 supports outer coating 30, which does not cover the entirety of the blank, but which leaves a frame 31 uncoated so that inner coating 32 can seal the sidewall at seam 26.

Figure 1B:
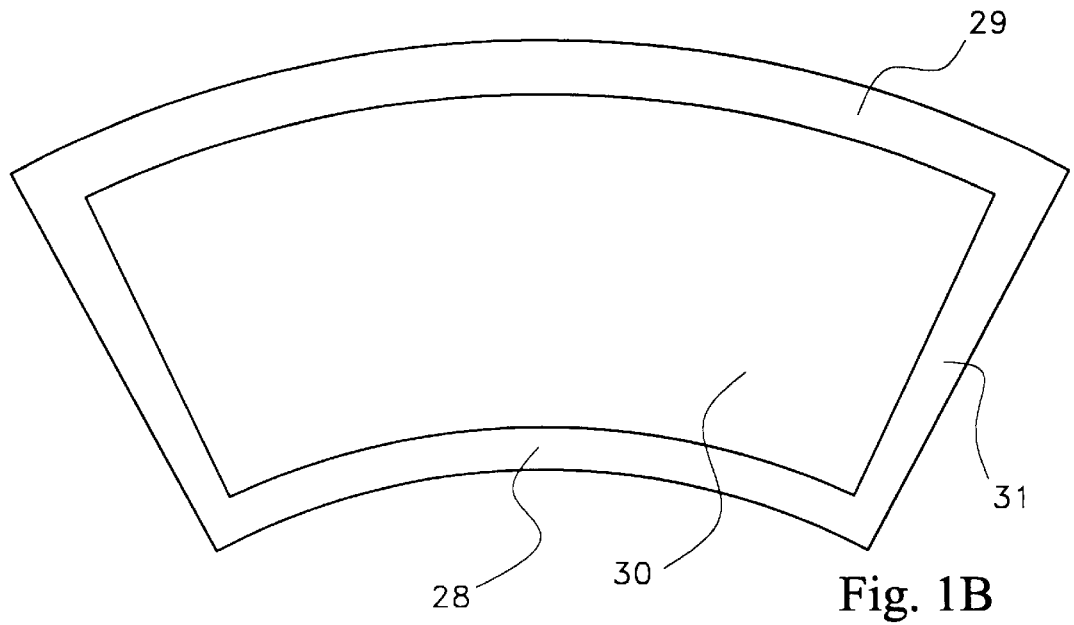
Figure 1C:
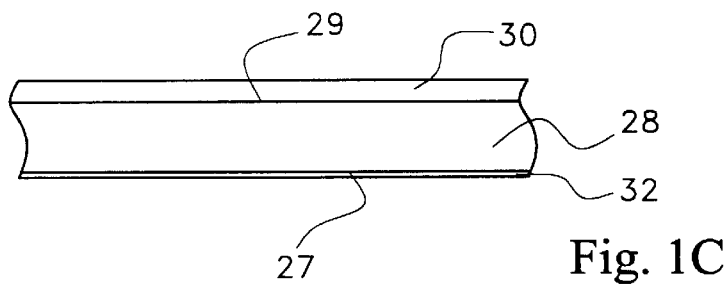
Figure 1D:
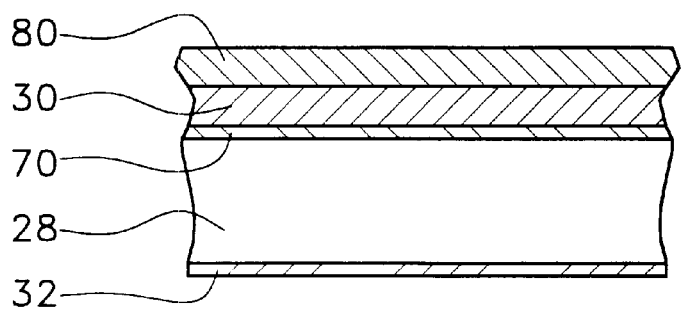
Figure 1E:
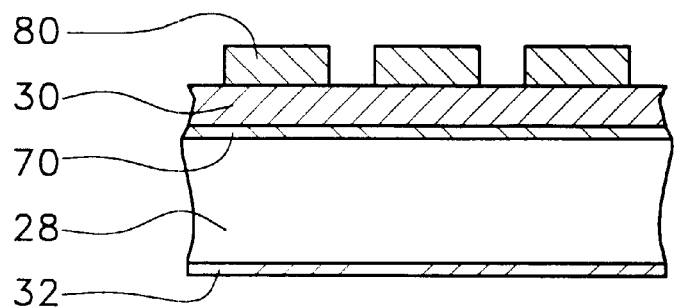
Figure 1F:
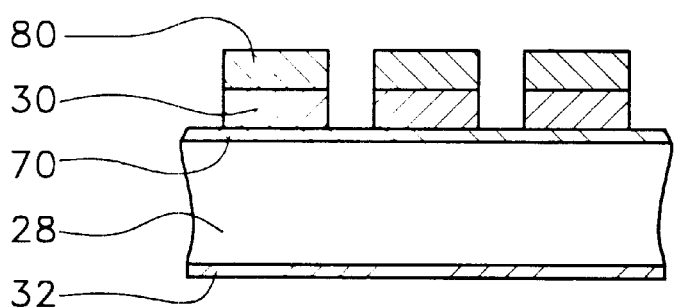
Figure 1G:
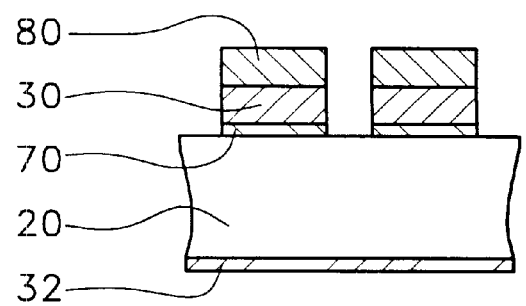
Figure 1H:
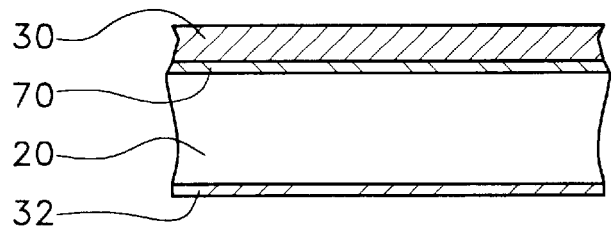
Figure 1I:
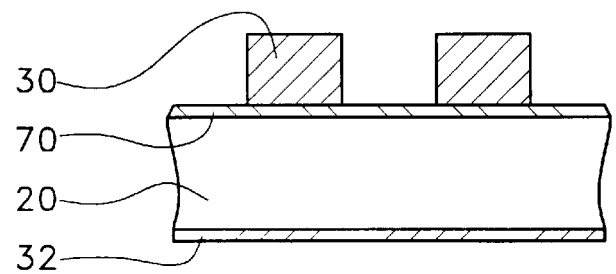

In one embodiment of the invention, outer coating 30 is continuous over a major part (absent frame 31) of the sidewall as shown in FIG. 1B. A cross section of the various layers is shown in FIG. 1C. Of course, multiple layers could be added to this structure to promote adhesion, increase thermal insulation, or to enhance appearance. Some of the possible arrangements are shown in FIG. 1D through FIG. 1I wherein layer 80 is a second thermally insulating layer which is supported by thermally insulating outer coating 30 and tie coat 70 is interspersed between the thermally insulating outer layer and sidewall 20 to promote adhesion between them. The tie coat is a synthetic material such as acrylic or cationic resin whose thickness may range from 0.01 to 50 mils. Inner coating 32 serves the same function as in FIG. 1C. Each of the thermally insulating coatings, 30 and 80, may be continuous as in FIG. 1D, patterned as in FIG. 1F, or a combination of these as in FIG. 1E where the outer coating 30 is continuous and second layer 80 is patterned. FIG. 1G shows the tie coat 70, the thermally insulating outer coating 30, and the second thermally layer 80 as patterned. FIG. 1H depicts a continuous tie coat 70 and continuous thermally insulating outer coating 70, and FIG. 1I illustrates a patterned thermally insulating outer coating 30 and a continuous tie coat 70. Additional layers may be added to achieve greater thermal insulation or for decorative effects. The areas left uncovered are for the lips and seam.

The outer coating may be applied by any process such as spraying, air knife, or withdrawing a substrate from a bath. These are all well known in the art of coating. In addition, the outer coating may be applied by any printing process, such as: offset, gravure, flexographic, rotary screen, wire rod, air knife, spray, or others. Preferably the printing is done through a rotary metal screen. Rotary screen printing is well adapted to high volume production, typical machines being furnished by Stork Brabant, Charlotte, N.C. An outer coating of 10 to 30 mils in thickness may be achieved in a single pass. and thicker coatings are possible with multiple applications. The function of the outer coating is to provide a controlled amount of insulation so that the user can hold the container comfortably, yet know that a hot or cold food or liquid is contained inside. By controlling the composition and thickness of the outer coating, thermal protection to the user is achieved while minimizing the material cost of the container. The outer coating contains void containing particles which can be made from thermoplastic, thermoset, or inorganic materials. A void containing particle comprises an outer shell of arbitrary shape which surrounds any medium of lower thermal conductivity or lower density. The void containing particle may be in expanded or unexpanded form. An unexpanded void containing particle will expand with the application of heat which expands the encapsulated medium and also softens the surrounding outer shell until the pressure of the medium is balanced by restraining forces in the outer shell. The void containing particles may range from 0.1 microns to 200 microns in size in either form. Typical examples of the materials of the outer shell would be polyvinylidene copolymers or glass. The largest size in the application process being limited by the openings in the metal mesh of the printing machine. If unexpanded microspheres are applied to the blank, a subsequent heating process may be employed to expand them. This might be coupled with the sealing operation. Experiments have also shown that multiple applications of unexpanded microspheres, separated by an expansion step provide better insulation than a single application of the same thickness. The binder holding the microspheres may be any suitable synthetic or natural binder including aqueous based, solvent based, high solids, or 100% solids materials, such as radiation cured systems, which are mentioned in the references. Additional ingredients may be added to the formulation, such as: pigments or dyes for coloring, fillers/extenders or organic or inorganic materials, and surfactants for dispersion or rhelogy, thickeners and solvents to control viscosity for optimized application, foaming agents to control the density of the coating, additives like waxes or slip aids, plasticizers and other ingredients common and well known to the art of formulation of coatings. Among many possible inorganic fillers, typical ones which may be selected include clay, silica, or a variety of calcium carbonates. In a preferred embodiment, the resin is acrylic, the void containing particles are synthetic microspheres whose particle size distribution ranges from 10 to 20 microns, and whose weight fraction in the wet mix ranges from 1 to 20 percent. The microspheres are available from Akzo Nobel, Duluth, Ga. Other additions may include: inorganic silica beads which are available as "Sil-cell" brand from Silbrico Corporation, Hodgkins, Ill., or coated microspheres which are available as "Dualite" brand from Pierce and Stevens, a division of Pratt and Lambert, Buffalo, N.Y.

Figure 2:
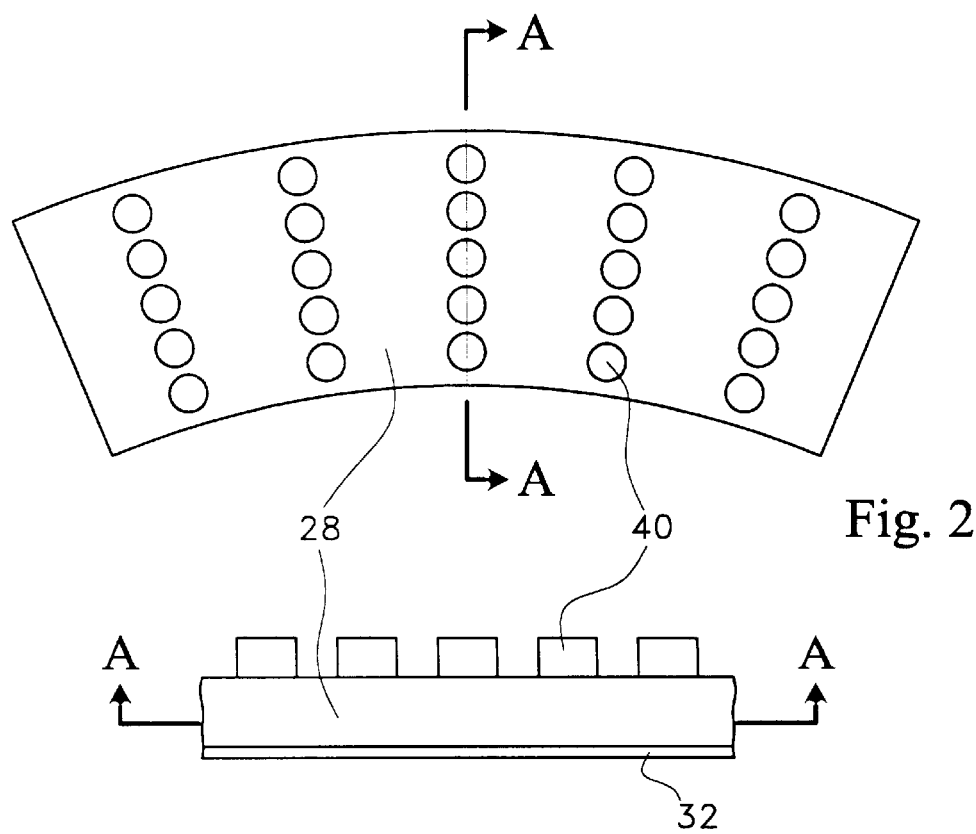
FIG. 2 shows a blank of another embodiment.

Referring now to FIG. 2, there is shown blank 28 supporting a pattern comprising a matrix of elements such as dots, but it can be any interrupted pattern of elements such as: dots, lines, quadrangles, arcs, alphabetical letters, symbols, or any other fanciful configuration. The common properties among them being that (1) the interrupted pattern saves material, and (2) the pattern elements are sufficiently close together to prevent fingers from descending between the pattern elements to touch the sidewall. The insulation properties of the pattern are therefore controlled by the thickness and composition of the material comprising pattern 40, together with the ratio of the area of the elements of pattern 40 to the area of the sidewall beneath a user's fingers. Area ratios may range from 1 to 100 percent. The lower end of the coverage ratio being controlled by the maximum distance between pattern elements which will support a finger away from sidewall 20.

Figure 3:
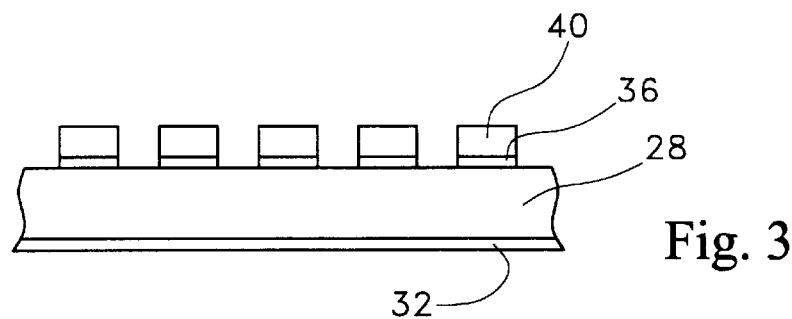
FIG. 3 shows a cross section of the sidewall of yet another embodiment.

Referring now to FIG. 3, there is shown yet another embodiment of the invention which is similar to the embodiment described in FIG. 2 except that a tie coat 36 is interspersed between the blank 28 and the pattern 40. The purpose of this underlayer is to promote adhesion between the blank and the pattern. In this embodiment, the tie coat is not continues, but has the same geometry as pattern 40. The tie coat is a synthetic or natural material such as acrylic or cationic resins whose thickness ranges from 0.01 to 50 mils for a single application as in the previous embodiment.

Figure 4:
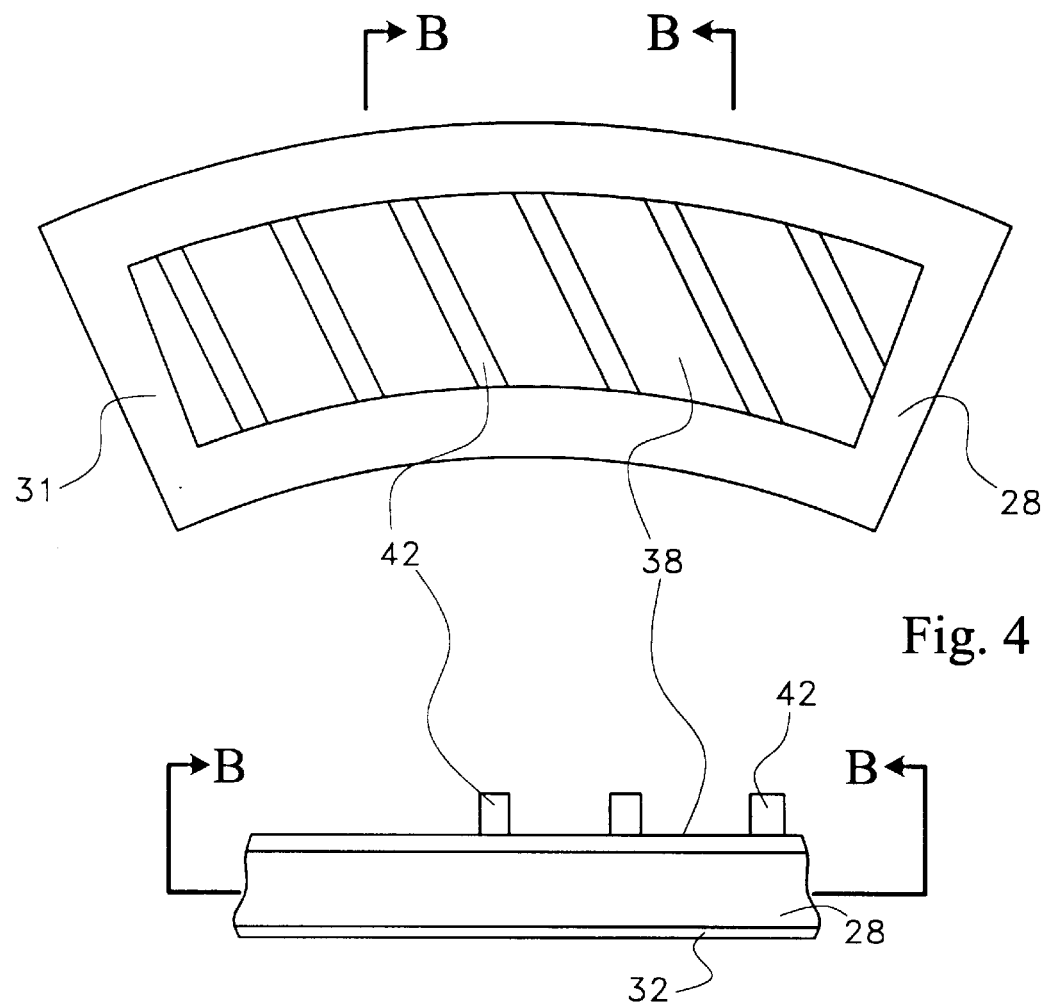
FIG. 4 shows a blank and cross section of a further embodiment.

Referring now to FIG. 4, there is shown a further embodiment of the invention wherein tie coat 38 is a continuous layer supported by blank 28 comprising sidewall 20. The tie coat promotes adhesion between the blank and pattern elements 42, which in this case are shown as a series of lines, but which may be any fanciful pattern. The discussion of various pattern elements referring to FIG. 2 is repeated here. The tie coat has a thickness ranging from 0.01 mils to 100 mils, preferably five to ten mils, so it also provides a degree of insulation protecting the fingers of a user. It also may provide for moisture protection and it may enhance the appearance of the container in conjunction with the pattern elements. At least one additional layer 44 may be applied over layer 42.

Figure 5:
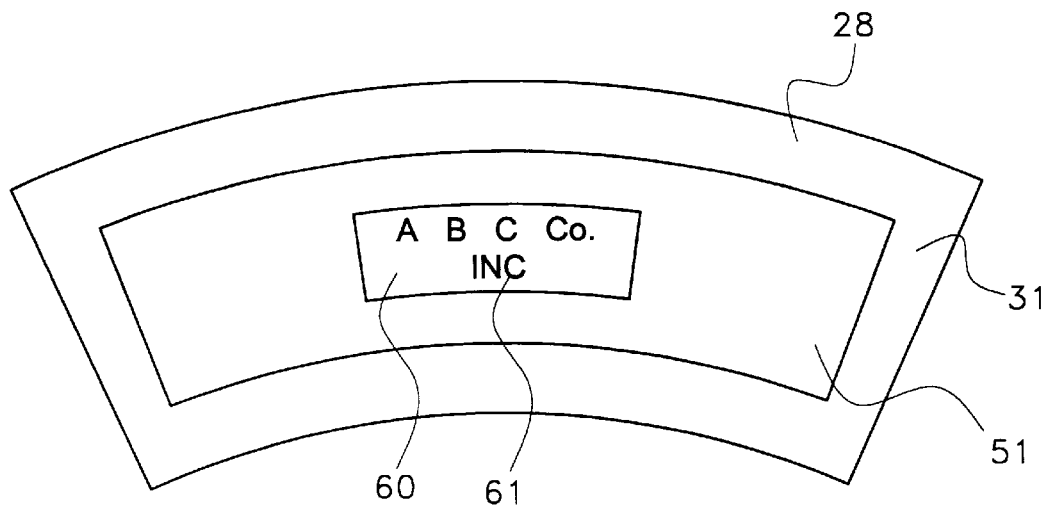
FIG. 5 shows a blank of yet a further embodiment.

Referring now to FIG. 5, there is shown yet a further embodiment of the present invention wherein blank 28 supports outer coating 51 within frame area 31. Outer coating 51 defines a label area 60 within which graphic information 61 may be printed which identifies or advertises the maker of the cup, the purveyor of its contents, or any other information. Outer coating 51 may be a continues coating as in FIG. 1, or it may be comprised of a matrix of pattern elements as described in the discussions regarding FIG. 2 or FIG. 3.

Figure 6A:
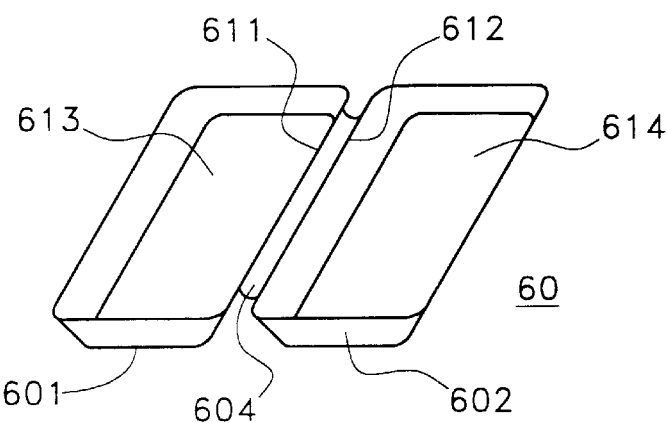
FIGS. 6A–6B show a foldable food container insulated with a syntactic foam.

Referring now to FIG. 6, there is shown still a further embodiment of the invention wherein apparatus 60 is adapted to the containment of hot or cold food items. A first portion 601 of apparatus 60 has an edge 611, an inner surface 613, and an outer surface 619. The first portion is dish-shaped so that it defines an open volume with its inner surface. Similarly, second portion 602 defines another open volume with inner surface 614. It also has an edge 612 which is joined to edge 611 by flexible web portion 604. The second portion also has an outer surface 618. When the first portion is folded over upon the second portion a closed volume is defined which is suitable for the containment of hot or cold food items.

Figure 6B:
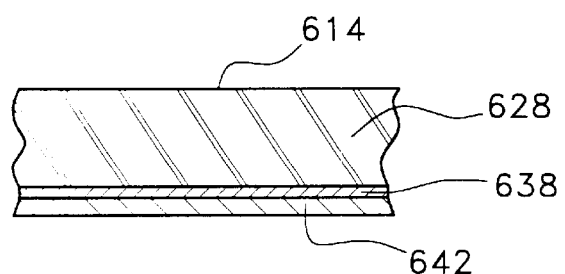

The first and second portions are comprised of a sidewall 628 which may be paper, paperboard, or plastic. A tie coat 638 is applied to the outer surface of the sidewall to promote adhesion, provide a moisture barrier, or enhance appearance. A thermally insulating outer coating 642 is applied to the tie coat or directly upon the sidewall as shown in FIG. 6B. The composition, application, properties, and functions of the outer coating were given in the description of FIG. 1 to FIG. 5, and are repeated here. At least one thermally insulating layer 643 may be applied over and supported by outer coating 642.

Figure 7A:
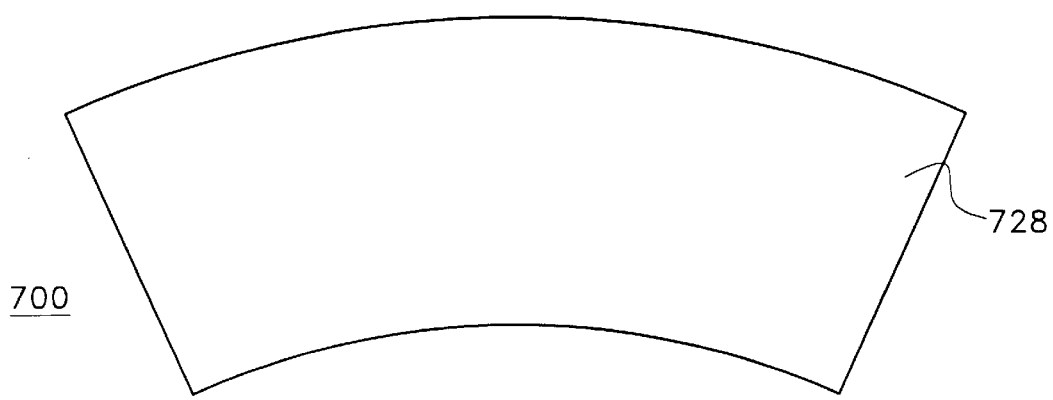
FIGS. 7A–7C show a thermally insulated sleeve in an additional embodiment.
Figure 7B:
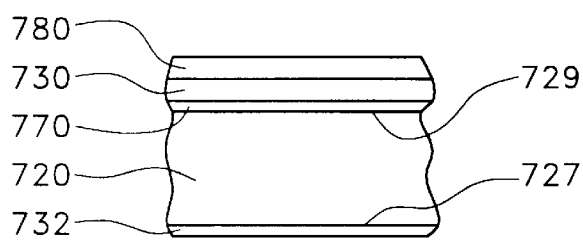
Figure 7C:
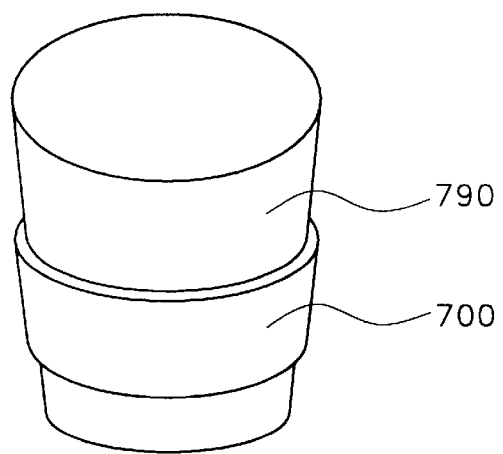

Referring now to FIG. 7A, there is shown an additional embodiment of the invention wherein apparatus 700 is comprised of blank 728 upon which various layers may be deposited. FIG. 7B shows a cross section of these layers wherein an inner coating 732 is applied to inner surface 727 of sidewall 720. Tie coat 770 may be interspersed between thermally insulating outer coating 730 and outer surface 729 of sidewall 720 to promote adhesion between them. A second thermally insulating layer 780 may be applied over outer coating 730 to provide additional insulation. The function, composition, and application of these layers have been described in the discussion of FIG. 1 through FIG. 5 in which the last two digits of the element numbers correspond to those of the element numbers in FIG. 7. FIG. 7C depicts apparatus 700 formed into a conical shape, open at both ends, so it is adapted to mate with a conical cup 790. The advantage of this embodiment is that it provides thermal insulation to the vast existing inventory of conventional cups or containers.

Changes and modifications in the specifically described embodiments can be carried out without departing from the scope of the invention. In particular, in any of the embodiments above, multilayers comprised of unexpanded void containing particles, previously expanded void containing particles, or both, are also within the scope of the invention. The resulting thickness could reach 120 mils or more. A coating containing void containing particles plus a foaming agent could provide a spongy coating. Various combinations of underlayers and patterns are also within the scope of the invention.

We claim:

1. An insulated container comprising:
   a base having an edge;
   a sidewall, having an inner surface and an outer surface, surrounding the base; and
   a thin thermally insulating outer coating having a controlled thickness, directly printed on the outer surface of the sidewall, said thin thermally insulating outer coating comprising a binder and void containing particles, ranging from 0.1 microns to 200 microns in size, adapted to being restricted by the binder.

2. The insulated container of claim 1 wherein the binder is a resin.

3. The insulated container of claim 1 wherein the controlled thickness is selected sufficiently thin to provide a thermal sensation and sufficiently thick as to not cause discomfort from the thermal sensation.

4. The insulated container of claim 1 wherein the controlled thickness is selected between 10 mils and 30 mils.

5. The insulated container of claim 1 wherein the binder is a dispersion of resins.

6. The insulated container of claim 1 wherein the binder is aqueous based.

7. The insulated container of claim 1 wherein the binder is solvent based.

8. The insulated container of claim 1 wherein the binder is a radiation cured system.

9. The insulated container of claim 1 wherein the void containing particles are expanded in form.

10. The insulated container of claim 1 wherein the void containing particles are unexpanded in form.

11. The insulated container of claim 1 wherein the void containing particles are a combination of expanded and unexpanded materials.

12. The insulated container of claim 1 wherein the thin thermally insulating outer coating further comprises a pigment.

13. The insulated container of claim 1 wherein the thin thermally insulating outer coating further comprises an inorganic filler.

14. The insulated container of claim 1 wherein the thin thermally insulating outer coating further comprises a surfactant.

15. The insulated container of claim 1 wherein the thin thermally insulating outer coating further comprises a foaming agent.

16. The insulated container of claim 1 further comprising an inner coating, supported by the inner surface of the sidewall, adapted to seal the sidewall upon itself and upon the edge of the base to form a seam.

17. The insulated container of claim 1 further comprising a tie coat interspersed between the outer surface and the thin thermally insulating outer coating, the tie coat being adapted to promote adhesion between the sidewall and the thin thermally insulating outer coating.

18. The insulated container of claim 1 further comprising at least one thermally insulating layer supported by the thin thermally insulating outer coating.

19. An insulated paper container comprising:
   a base having an edge;
   a sidewall, having an inner surface and an outer surface, surrounding the base; and
   a thin thermally insulating outer coating having a controlled thickness, directly printed on the outer surface of the sidewall, said thin thermally insulating outer coating comprising a binder and void containing particles, ranging from 0.1 microns to 200 microns in size, adapted to being restricted by the binder.

20. The insulated container of claim 19 wherein the binder is a synthetic resin.

21. The insulated container of claim 19 wherein the controlled thickness is selected sufficiently thin to provide a thermal sensation and sufficiently thick as to not cause discomfort from the thermal sensation.

22. The insulated container of claim 19 wherein the controlled thickness is selected between 10 mils and 30 mils.

23. The insulated container of claim 19 wherein the binder is a dispersion of resins.

24. The insulated container of claim 19 wherein the binder is aqueous based.

25. The insulated container of claim 19 wherein the binder is solvent based.

26. The insulated container of claim 19 wherein the binder is a radiation cured system.

27. The insulated container of claim 19 wherein the void containing particles are expanded in form.

28. The insulated container of claim 19 wherein the void containing particles are unexpanded in form.

29. The insulated container of claim 19 wherein the void containing particles are a combination of expanded and unexpanded materials.

30. The insulated container of claim 19 wherein the thin thermally insulated outer coating further comprises a pigment.

31. The insulated container of claim 19 wherein the outer coating further comprises an inorganic filler.

32. The insulated container of claim 19 wherein the outer coating further comprises a surfactant.

33. The insulated container of claim 19 wherein the thin thermally insulating outer coating further comprises a foaming agent.

34. The insulated container of claim 19 further comprising an inner coating, supported by the inner surface of the sidewall, adapted to seal the sidewall upon itself and upon the edge of the base to form a seam.

35. The insulated container of claim 19 further comprising a tie coat interspersed between the thin thermally insulating outer surface and the outer coating, the tie coat being adapted to promote adhesion between the sidewall and the thin thermally insulating outer coating.

36. The insulated paper container of claim 19 further comprising at least one thin thermally insulating layer supported by the thermally insulating outer coating.

37. An insulated paper container comprising:
   a base having an edge;
   a sidewall, having an inner surface and an outer surface, surrounding the base; the inner surface supporting an inner coating adapted to seal the sidewall upon itself and upon the edge of the base;
   a thin thermally insulating outer coating having a controlled thickness, directly printed on the outer surface of the sidewall, said thin thermally insulated outer coating comprising a binder of acrylic resin, and void containing particles ranging from 0.1 microns to 200 microns in size, adapted to being restricted by the binder, and
   a lip formed upon an extremity of the sidewall opposite to the base.

38. The insulated container of claim 37 wherein the void containing particles are expanded in form.

39. The insulated container of claim 37 wherein the void containing particles are unexpanded in form.

40. The insulated container of claim 37 wherein the void containing particles are a combination of pre-expanded and unexpanded materials.

41. The insulated container of claim 37 wherein the thin thermally insulating outer coating further comprises a pigment.

42. The insulated container of claim 37 wherein the thin thermally insulating outer coating further comprises an inorganic filler.

43. The insulated container of claim 37 wherein the thin thermally insulating outer coating further comprises a surfactant.

44. The insulated container of claim 37 wherein the thin thermally insulating outer coating further comprises a foaming agent.

45. The insulated container of claim 37 further comprising a tie coat, interspersed between the outer surface of the sidewall and the thin thermally insulating outer coating, being adapted to promote adhesion between the sidewall and the thin thermally insulating outer coating.

46. The insulated container of claim 37 wherein the thin thermally insulating outer coating is continuous over a major part of the sidewall.

47. The insulated container of claim 37 wherein the thin thermally insulating outer coating comprises an interrupted pattern of closely spaced elements.

48. The insulated container of claim 47 wherein the interrupted pattern comprises circular dots arranged in a matrix.

49. The insulated container of claim 47 wherein the spaces between the closely spaced elements are limited to prevent fingers from descending between the closely spaced elements to touch the sidewall.

50. The insulated paper container of claim 37 further comprising at least one thin thermally insulating layer having a controlled thickness supported by the thin thermally insulating outer coating.

51. The insulated container of claim 37 wherein the thin thermally insulating outer coating defines an aperture within which graphical information may be affixed to the sidewall.

52. A blank adapted to the manufacture of a paper container having an outer surface, an inner surface, an upper edge, a lower edge, a left edge, and a right edge comprising:
   an inner coating supported by the inner surface, and
   a thin thermally insulating outer coating having a controlled thickness direct printed on the outer surface;
   wherein the outer coating comprises a binder and void containing particles, ranging from 0.1 microns to 200 microns in size, adapted to being restrained by the binder.

53. The blank of claim 52 further comprising at least one thin thermally insulating layer having a controlled thickness supported by the thermally insulating outer coating.

54. The blank of claim 52 further comprising a tie coat interspersed between the outer surface and the thin thermally insulating outer coating, the tie coat being adapted to promote, adhesion between the outer surface and the thin thermally insulating outer coating.

55. An insulated food container comprising:
   a first portions having at least one edge and an outer and an inner surface;
   a flexible web portion being attached to an edge of the first portion;
   a second portion, having at least one edge and an outer and an inner surface, being attached to the web portion so that folding the first portion over upon the second portion defines a volume; and
   a thin thermally insulating outer coating having a controlled thickness, directly printed on at least one of said outer surfaces, said thin thermally insulating outer coating comprising a binder and void containing particles adapted to being restrained by the binder.

56. The insulated food container of claim 55 further comprising a tie coat interspersed between an outer surface and the thin thermally insulating outer coating, the tie coat being adapted to promote adhesion between the outer surface and the thin thermally insulating outer coating.

57. The insulated food container of claim 55 further comprising at least one thin thermally insulating layer having a controlled thickness supported by the thermally insulating outer coating.

58. A thermally insulated sleeve adapted to fit over a cup, the sleeve comprising;

a sidewall having an inner surface and an outer surface;

a thin thermally insulating outer coating having a controlled thickness, supported by the outer surface of the sidewall, comprising a binder and void containing particles, ranging from 0.1 microns to 200 microns in size, adapted to being restricted by the binder; and wherein the inner surface of the sidewall is adapted to seal the sidewall upon itself and to form a seam.

59. The thermally insulated sleeve of claim 58 further comprising a tie coat interspersed between the outer surface and the thin thermally insulating outer coating, the tie coat being adapted to promote adhesion between the sidewall and the outer coating.

60. The thermally insulated sleeve of claim 58 further comprising at least one thin thermally insulating layer having a controlled thickness supported by the thin thermally insulating outer coating.

61. The thermally insulated sleeve of claim 58 further comprising a cup attached to the inner surface of said thermally insulated sleeve.

62. A blank adapted to the manufacture of a thermally insulated sleeve which is adapted to fit over a cup having a conical shape, the blank comprising;

a sidewall having an inner surface and an outer surface;

a thin thermally insulating outer coating having a controlled thickness, supported by the outer surface of the sidewall, comprising a binder and void containing particles, ranging from 0.1 microns to 200 microns in size, adapted to being restricted by the binder; and wherein the inner surface of the sidewall is adapted to seal the sidewall upon itself and to form a seam.

63. The blank of claim 62 further comprising a tie coat interspersed between the outer surface and the thin thermally insulating outer coating, the tie coat being adapted to promote adhesion between the sidewall and the thin thermally insulating outer coating.

64. The blank of claim 62 further comprising at least one thin thermally insulating layer having a controlled thickness supported by the thin thermally insulating outer coating.

* * * * *